(12) United States Patent
Hayashi et al.

(10) Patent No.: US 7,468,338 B2
(45) Date of Patent: *Dec. 23, 2008

(54) OPTICAL GLASS, PRESS-MOLDING PREFORM AND OPTICAL PART

(75) Inventors: Kazutaka Hayashi, Tokyo (JP); Yasuhiro Fujiwara, Tokyo (JP); Zou Xuelu, Tokyo (JP)

(73) Assignee: Hoya Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/902,409

(22) Filed: Sep. 21, 2007

(65) Prior Publication Data

US 2008/0026928 A1    Jan. 31, 2008

Related U.S. Application Data (60) Continuation of application No. 10/977,937, filed on Nov. 1, 2004, now abandoned, which is a division of application No. 10/078,159, filed on Feb. 20, 2002, now Pat. No. 6,844,279.

(30) Foreign Application Priority Data

Feb. 20, 2001 (JP) ............................. 2001-042723

(51) Int. Cl.
C03C 3/15   (2006.01)
C03C 3/155  (2006.01)
C03C 3/068  (2006.01)

(52) U.S. Cl. ..................... 501/50; 501/51; 501/78; 501/79

(58) Field of Classification Search ............. 501/49–51, 501/77–79
See application file for complete search history.

(56) References Cited

U.S. PATENT DOCUMENTS

| | | | |
|---|---|---|---|
| 3,958,999 A | 5/1976 | Izumitani et al. | |
| 4,111,707 A | 9/1978 | Komorita et al. | |
| 4,584,279 A | 4/1986 | Grabowski et al. | |
| 4,798,768 A | 1/1989 | Oversluizen et al. | |
| 6,251,813 B1 | 6/2001 | Sato | |
| 6,413,894 B1 | 7/2002 | Sato | |
| 6,844,279 B2 | 1/2005 | Hayashi et al. | |
| 6,977,232 B2 | 12/2005 | Hayashi et al. | |

FOREIGN PATENT DOCUMENTS

| | | |
|---|---|---|
| CN | 1068661 A | 2/1993 |
| DE | 27 56 161 | 6/1979 |
| DE | 3102690 A1 | 6/1992 |
| DE | 199 19 304 A1 | 11/1999 |
| DE | 100 53 388 A1 | 5/2001 |
| JP | 48-37410 | 6/1973 |
| JP | 48-61517 | 8/1973 |
| JP | 60-221338 | 11/1985 |
| JP | 4-92835 | 3/1992 |
| JP | 05-058669 | 3/1993 |
| JP | 08-026766 | 1/1996 |
| JP | 8-276765 | 1/1996 |
| JP | 8-59282 | 3/1996 |
| JP | 2000-016831 | 1/2000 |
| JP | 2002-128539 | 5/2002 |

OTHER PUBLICATIONS

Machine translation of JP 08-026765, date unknown.

*Primary Examiner*—J. A. Lorengo
*Assistant Examiner*—Elizabeth A Bolden
(74) *Attorney, Agent, or Firm*—Nixon & Vanderhye P.C.

(57) ABSTRACT

A high-refractivity low-dispersion optical glass that gives press-molding preforms excellent in high-temperature shapability and suitable for precision press-molding, including an optical glass comprising $B_2O_3$, $La_2O_3$, $Gd_2O_3$ and ZnO as essential components, substantially containing none of lead and fluorine, having a refractive index (nd) of 1.72 to 1.83, an Abbe's number (vd) of 45 to 55 and a glass transition temperature (Tg) of 630° C. or lower and having a viscosity of at least 0.6 Pa·s at its liquidus temperature, and an optical glass comprising, by mol %, 45 to 65% of $B_2O_3$, 5 to 22% of $La_2O_3$, 1 to 20% of $Gd_2O_3$, provided that the total content of $La_2O_3$ and $Gd_2O_3$ is 14 to 30%, 5 to 30% of ZnO, 0 to 10% of $SiO_2$, 0 to 6.5% of $ZrO_2$ and 0 to 1% of $Sb_2O_3$, substantially containing none of lead and fluorine, and having a refractive index (nd) of 1.72 to 1.83 and an Abbe's number (vd) of 45 to 55.

2 Claims, 1 Drawing Sheet

OPTICAL GLASS, PRESS-MOLDING PREFORM AND OPTICAL PART

CROSS REFERENCE TO RELATED APPLICATION

This application is a continuation of application Ser. No. 10/977,937 filed Nov. 1, 2004 now abandoned, which in turn is a divisional of application Ser. No. 10/078,159 filed Feb. 20, 2002, now U.S. Pat. No. 6,844,279, which in turn claims priority from Japanese Serial No. 2001-42723 filed Feb. 20, 2001.

FIELD OF THE INVENTION

The present invention relates to an optical glass, a press-molding perform, an optical part, a process for the preparation of a preform and a process for the production of a press-molded article, particularly, an optical part. More specifically, the present invention relates to a $B_2O_3$—$La_2O_3$—$Gd_2O_3$—ZnO-containing high-refractivity low-dispersion optical glass, a press-molding preform made of the optical glass, an optical part made of the optical glass, a process for the preparation of a press-molding preform suitable for precision press-molding, and a process for efficiently producing press-molded articles, particularly, optical parts by press-molding the above preform.

PRIOR ART OF THE INVENTION

In recent years, digital cameras have come to be available, and higher integration and higher function achievement of devices and machines using optical systems are rapidly forwarded. Under the circumstances, optical systems are increasingly demanded to attain higher precision and a decrease in weight and size, and for complying with such demands, optical designs using aspherical lenses are about to constitute the mainstream. For stable supply of a large volume of aspherical lenses made of a highly functional glass at a low cost, attention is given to a molding technology of directly forming an optical surface by press-molding without any cutting and polishing, and demands for optical glasses having high functionality suitable for molding, such as a glass that exhibits high refractivity and low dispersion (to be referred to as "high-refractivity low-dispersion glass" hereinafter) are increasing year after year.

Meanwhile, in any conventional high-refractivity low-dispersion glass, importance is attached to chemical durability, heat devitrification resistance and press-moldability, and under the circumstances, no consideration is given to high-temperature shapability of a press-molding preform needed in press-molding a press material made of a glass by re-heating it, which high-temperature shapability is an important factor for providing a predetermined amount of a molten glass and shaping it into a form suitable for press-molding of a preform, before the glass is completely cooled. Particularly, concerning a high-refractivity low-dispersion optical glass, for example, having a refractive index (nd) of at least 1.72 and an Abbe's number (vd) of at least 45, it is difficult to shape such a glass into a press-molding preform at a high temperature, which difficulty is a barrier against the production of a precision-press aspherical lens made of a high-refractivity low-dispersion glass. That is, a high-refractivity low-dispersion glass composed of $B_2O_3$ and $La_2O_3$ as main components exhibits a high liquidus temperature or exhibits a low high-temperature viscosity, so that the high-temperature shapability of the glass for a press-molding preform is degraded, and it is difficult to prepare a press-molding preform having high accuracy such as weight accuracy.

JP-A-8-26765 discloses an optical glass composed of $B_2O_3$ and $La_2O_3$ as main components. This glass has a refractive index (nd) of 1.68 to 1.80, an Abbe's number (vd) of 44 to 53 and a sag temperature of 630° C. or lower. However, this optical glass is intended for providing a glass composition that is free from volatilization of a large amount of components during molding, excellent in chemical durability and stability against devitrification and free from environmental pollution. JP-A-8-26765 does not at all refer to any press-molding preform, and it is needless to say that it does not at all refer to the high-temperature shapability of the glass for a press-molding preform.

SUMMARY OF THE INVENTION

Under the circumstances, it is an object of the present invention to provide a high-refractivity low-dispersion optical glass excellent in high-temperature shapability and press-moldability, a press-molding preform made of the above optical glass, a process for the preparation of the press-molding preform, and a process for the production of a precision press-molded article from the above press-molding preform.

The present inventors have made diligent studies and as a result have found that the above object can be achieved by an optical glass comprising specific glass components and having a refractive index, an Abbe's number, a glass transition temperature and a viscosity at a liquidus temperature in specific ranges, or an optical glass having a specific glass composition and a refractive index and an Abbe's number in specific ranges. The present invention has been accordingly completed on the basis of the above findings.

That is, according to the present invention, there are provided;

(1) an optical glass comprising $B_2O_3$, $La_2O_3$, $Gd_2O_3$ and ZnO as essential components, substantially containing none of lead and fluorine, having a refractive index (nd) of 1.72 to 1.83, an Abbe's number (vd) of 45 to 55 and a glass transition temperature (Tg) of 630° C. or lower and having a viscosity of at least 0.6 Pa·s at its liquidus temperature (to be referred to as "optical glass I" hereinafter), (2) an optical glass comprising, by mol %, 45 to 65% of $B_2O_3$, 5 to 22% of $La_2O_3$, 1 to 20% of $Gd_2O_3$, provided that the total content of $La_2O_3$ and $Gd_2O_3$ is 14 to 30%, 5 to 30% of ZnO, 0 to 10% of $SiO_2$, 0 to 6.5% of $ZrO_2$ and 0 to 1% of $Sb_2O_3$, substantially containing none of lead and fluorine, and having a refractive index (nd) of 1.72 to 1.83 and an Abbe's number (vd) of 45 to 55 (to be referred to as "optical glass II" hereinafter).

(3) a press-molding preform made of the above optical glass I or optical glass II, (4) an optical part made of the above optical glass I or optical glass II, (5) a process for the preparation of a press-molding preform, which comprises preparing a glass gob from a predetermined amount of a molten glass and shaping the glass gob into a press-molding preform made of the above optical glass I or optical glass II, (6) a process for the production of a press-molded article, which comprises re-heating the press-molding preform recited in the above (3) or the press-molding preform prepared by the method recited in the above (5) and press-molding the press-molding preform, and (7) a process for the production of an optical part, which comprises forming an optical part by the process recited in the above (6).

PREFERRED EMBODIMENTS OF THE INVENTION

The optical glass of the present invention has high-refractivity and low-dispersion properties and is excellent as a glass material for producing optical parts such as a lens by press-molding, particularly, precision press-molding. The above term "high-refractivity and low-dispersion properties" implies a refractive index (nd) of at least 1.72 and an Abbe's number (vd) of at least 45 in terms of optical properties. The term "precision press-molding" of a glass refers to a method in which a re-heated press-molding preform is press-molded with a mold having a predetermined cavity form, to obtain a glass molded article having a final product form or a form very close thereto and having a surface accuracy. According to the precision press-molding, molded articles having a desired form can be produced with high productivity, so that optical parts made of a glass such as spherical lenses, aspherical lenses and diffraction gratings are currently produced by the precision press-molding. In the precision press-molding, a mold for the pressing is exposed to high-temperature and high-pressure conditions. In a glass for use in the precision press-molding, therefore, it is desirable to decrease the glass transition temperature (Tg) and the sag temperature (Ts) so as to make them as low as possible, for preventing a high-temperature environment during press-molding from causing damage on a mold per se or a release film formed on the mold surface caused.

The optical glass of the present invention includes two embodiments for satisfying the above requirement, that is, optical glasses I and II.

First, the optical glass I will be explained below.

The optical glass I of the present invention comprises $B_2O_3$, $La_2O_3$, $Gd_2O_3$ and ZnO as essential components, substantially contains none of lead and fluorine, has a refractive index (nd) of 1.72 to 1.83, an Abbe's number (vd) of 45 to 55 and a glass transition temperature (Tg) of 630° C. or lower and has a viscosity of at least 0.6 Pa·s at its liquidus temperature.

When the above glass transition temperature (Tg) exceeds 630° C., a mold per se or a release film formed on a molding surface of the mold may be damaged during press-molding. Although not specially limited, the lower limit of the glass transition temperature (Tg) is generally 400° C. or higher.

In the above optical glass I, the refractive index (nd) is preferably in the range of from 1.74 to 1.80, the Abbe's number (vd) is preferably in the range of from 45 to 52, and the liquidus temperature is preferably 1,050° C. or lower, more preferably 1,030° C. or lower.

As a method of preparing a press-molding preform, a method of preparing a press-molding preform directly from a molten glass, which is melted, clarified and uniformly stirred, is remarkably excellent in productivity. In the above method of hot-shaping a glass into a press-molding preform (which is sometimes called "glass preform" or "glass gob"), the glass is liable to undergo devitrification when the glass has a high liquidus temperature (LT). Such a glass is therefore poor in mass-productivity, and desirably, the liquidus temperature is as low as possible. For accurately and uniformly preparing such precision press-molding preforms, further, the glass is required to have a viscosity of at least 0.6 Pa·s at its liquidus temperature, and the viscosity of the glass is preferably at least 0.7 Pa·s, more preferably 0.8 Pa·s.

When it is attempted to impart a conventional optical glass for precision press-molding with high-refractivity low-dispersion properties, the liquidus temperature increases, the thermal stability is degraded, or the glass is liable to undergo devitrification during the shaping of a press-molding preform.

The present inventors have made diligent studies with regard to shaping a high-refractivity low-dispersion optical glass into press-molding preforms, and it has been found that press-molding preforms can be prepared by a hot-shaping method excellent in mass-productivity so long as the optical glass has a viscosity of at least 0.6 Pa·s at its liquidus temperature. There has been accordingly invented an optical glass that comprises $B_2O_3$—$La_2O_3$—$Gd_2O_3$—ZnO as essential components and satisfies the above optical constants and high-temperature viscosity condition.

The method of preparing a press-molding preform (to be sometimes referred to as "preform" hereinafter) by hot-shaping refers, for example, to a method of preparing a uniform and foams-free molten glass through the steps of melting, clarifying and stirring, and shaping the molten glass into the form of a preform. Specifically, the molten glass is allowed to flow through a flow outlet of a pipe, and when molten glass that has flowed out comes to have a predetermined amount, a forward end portion of the molten glass that has flowed out is separated by itself or the molten glass is cut off. The separated glass is shaped into the form of a preform and cooled to obtain a preform. The method of separating a forward end portion of the molten glass that has flowed out includes a method in which the molten glass is dropped from a flow outlet of a pipe (dropping method) and a method in which a forward end portion of the molten glass is supported with a support member and the support member is moved downward at a rate higher than the flowing rate of the molten glass (falling-cutting method). The pipe to be used for flowing out the molten glass is preferably made of platinum or a platinum alloy. For flowing out the molten glass from the pipe and forming a preform by hot-shaping, it is required to satisfy the following requirements; the molten glass is to flow out of the pipe smoothly, a predetermined amount of the molten glass can be separated by the above separating method, the glass is to be free from devitrification at a flowing temperature of the molten glass, and the flowing temperature of the glass is to be lower than the heat-resistance temperature of the above pipe. For satisfying the above requirements, the viscosity of the glass at the liquidus temperature of the glass is at least 0.6 Pa·s, preferably at least 0.7 Pa·s, particularly preferably at least 0.8 Pa·s. Since a pipe made of platinum or platinum alloy has a heat-resistance temperature around 1,100° C., desirably, the viscosity of the glass at 1,100° C. is 4 Pa·s or lower.

The optical glass II of the present invention will be explained below.

The above properties can be attained by adjusting the composition of an optical glass containing $B_2O_3$—$La_2O_3$—$Gd_2O_3$—ZnO as essential components. That is, the optical glass II of the present invention comprises, by mol %, 45 to 65% of $B_2O_3$, 5 to 22% of $La_2O_3$, 1 to 20% of $Gd_2O_3$ (provided that the total content of $La_2O_3$ and $Gd_2O_3$ is 14 to 30%), 5 to 30% of ZnO, 0 to 10% of $SiO_2$, 0 to 6.5% of $ZrO_2$ and 0 to 1% of $Sb_2O_3$, substantially containing none of lead and fluorine, and having a refractive index (nd) of 1.72 to 1.83 and an Abbe's number (vd) of 45 to 55.

The optical glass II substantially does not contain any lead that causes detrimental effects on environments due to toxicity and which is easily reduced in press-molding in a nonoxidizing gas atmosphere to form a deposit as a metal, and further, the optical glass II substantially does not contain any fluorine that makes it difficult to shape a preform at a high temperature. That is, the optical glass II contains none of the above two elements, if their contents at the level of impurities are excluded.

For imparting a glass with intended high-temperature shapability, hot-shapability and optical properties and also forming a stable glass at the same time, the content of $SiO_2$ is adjusted to 0 to 10 mol %, and the content of $ZrO_2$ is adjusted to 0 to 6.5 mol %. $Sb_2O_3$ is a component that can be used as a defoaming agent. Since, however, it has toxicity, influences on environments are taken into account, and the content thereof is limited to 0 to 1 mol %, preferably to 0 to 0.5 mol %, more preferably to 0 to 0.1 mol %. While $As_2O_3$ can be also used as a defoaming agent, influences on environments are taken into account, and the content thereof is preferably limited to 0 to approximately 0.1 mol %. More preferably, $As_2O_3$ is not at all used.

The composition of the optical glass II of the present invention will be explained below. Amount ranges to be described hereinafter have been found on the basis of experimental chemistry.

$B_2O_3$ is an oxide for forming a glass network structure and is an essential component in the present invention. Particularly, when high-refractivity components such as $La_2O_3$, $Gd_2O_3$, etc., are incorporated in a large amount, it is required to increase the content of $B_2O_3$ for maintaining the stability of the glass. However, when the content of $B_2O_3$ exceeds 65 mol %, the refractive index of the glass decreases, and the chemical durability of the glass is also degraded. When the above content is less than 45 mol %, the glass tends to undergo devitrification to a greater extent, and the stability of the glass decreases. The content of $B_2O_3$ is therefore limited to 45 to 65 mol %, preferably to 47 to 60 mol %.

$La_2O_3$ is an essential component that increases the refractive index and improves the chemical durability without decreasing the stability of the glass against devitrification and without increasing the dispersion. When the content of $La_2O_3$ is less than 5 mol %, the above effects are not fully obtained. When the above content exceeds 22 mol %, the stability against devitrification decreases, and the glass transition temperature increases, so that it is difficult to prepare a preform by hot-shaping and precision-press-molding a preform. The content of $La_2O_3$ is therefore in the range of from 5 to 22 mol %, preferably 7 to 20 mol %.

Like $La_2O_3$, $Gd_2O_3$ is an essential component that not only works to improve the glass in refractivity and chemical durability while maintaining the stability of the glass against devitrification and low-dispersion properties, but also greatly serves to decrease the liquidus temperature and improve the high-temperature viscosity. When the content of $Gd_2O_3$ is less than 1 mol %, however, the above effects cannot be fully obtained. When the above content exceeds 20 mol %, the stability against devitrification decreases, and the glass transition temperature increases, so that the hot-shapability for a preform and the precision press-moldability of the preform are degraded. The content thereof is therefore limited to 1 to 20 mol %, preferably to 4 to 15 mol %.

For imparting a $B_2O_3$—$La_2O_3$—$Gd_2O_3$—ZnO-containing optical glass with high functionality such as a high refractive index (nd$\geq$1.72) and low-dispersion (vd$\geq$45), the total content of $La_2O_3$ and $Gd_2O_3$ is required to be at least 14 mol %. However, when the total content of $La_2O_3$ and $Gd_2O_3$ is greater than 30 mol %, the devitrification tendency of the glass is intensified, and the high-temperature viscosity decreases, so that it is difficult to prepare a preform by hot-shaping. The total content of $La_2O_3$ and $Gd_2O_3$ is therefore limited to 14 to 30 mol %, preferably to 14 to 24 mol %, more preferably to 15 to 22 mol %.

ZnO is an essential component that works to decrease the melting temperature and liquidus temperature of the glass and the transition temperature and is indispensable for adjusting the refractive index. When the content of ZnO is less than 5 mol %, the above effects are not fully obtained as expected. When the content thereof exceeds 30 mol %, the dispersion increases, and the stability against devitrification and the chemical durability decrease. The content of ZnO is therefore limited to 5 to 30 mol %, preferably to 8 to 25 mol %.

$SiO_2$ is a component for forming a glass network structure, and when it is incorporated in a small amount in place of $B_2O_3$ that is a main component, the liquidus temperature of the glass is decreased, and the high-temperature viscosity is improved. When the content of $SiO_2$ exceeds 10 mol %, the tendency of the glass to devitrification increases, and the glass transition temperature increases, so that the hot-shapability for a preform and the precision press-moldability of a preform decrease. The content of $SiO_2$ is therefore limited to 0 to 10 mol %, preferably to 0 to 8 mol %.

$ZrO_2$ is used as a component for imparting high-refractivity low-dispersion properties. When a small amount of $ZrO_2$ is introduced in place of $La_2O_3$ and $Gd_2O_3$, $ZrO_2$ produces an effect on improving the dispersion properties, high-temperature viscosity and stability against devitrification without decreasing the refractive index of the glass, so that it is preferred to introduce a small amount of $ZrO_2$. When the content of $ZrO_2$ exceeds 6.5 mol %, however, the liquidus temperature sharply increases, and the stability against devitrification also decreases. The content thereof is therefore limited to 0 to 6.5 mol %, preferably to 1 to 6.5 mol %.

$Sb_2O_3$ is a component that has been already explained.

Unlike other alkali components, $Li_2O$ is a component that decreases the glass transition temperature to a great extent without causing a great decrease in the refractive index and chemical durability. When a small amount thereof is introduced, it greatly exhibits the above effect, and it is effective for adjusting the thermal properties of the glass. When the content thereof is greater than 10 mol %, however, the stability of the glass against devitrification sharply decreases, and the liquidus temperature also increases, so that the content thereof is adjusted preferably to 0 to 10 mol %. The content of $Li_2O$ is more preferably limited to 0 to 7 mol %, still more preferably to 0.5 to 6.5 mol %. When it is attempted to needlessly decrease the glass transition temperature and the sag temperature by increasing the content of $Li_2O$, the refractive index decreases, which results in an increase in the content of $La_2O_3$ or $Gd_2O_3$. As a result, the above hot-shapability may be degraded.

Other alkali components, $Na_2O$ and $K_2O$, are added for decreasing the glass transition temperature. However, when too large an amount thereof is added, for example, when the content thereof exceeds 5 mol %, it is difficult to obtain intended optical properties or the refractive index decreases, and the chemical durability and the stability against devitrification may decrease. Therefore, preferably, the content of $Na_2O$ is 0 to 5 mol %, and the content of $K_2O$ is 0 to 5 mol %. Further, it is preferred to adjust the total content of $Li_2O$, $Na_2O$ and $K_2O$ to 10 mol % or less. The content of $Na_2O$ and $K_2O$ is preferably 0 to 4 mol % each, and the total content of $Li_2O$, $Na_2O$ and $K_2O$ is more preferably in the range of from 0 to 8 mol %.

All of divalent components such as MgO, CaO, SrO and BaO are components for decreasing the liquidus temperature and the transition temperature of the glass. When the content of each of these components exceeds 10 mol %, the stability of the glass against devitrification rather decreases, and the liquidus temperature also increases. It is therefore preferred to adjust the content of each component to 0 to 10 mol %. It is also preferred to adjust the total content of MgO, CaO, SrO and BaO to 0 to 15 mol %. More preferably, the content of each of MgO, CaO, SrO and BaO is limited to 0 to 8 mol %, and the total content of these components is limited to 0 to 12 mol %.

$Al_2O_3$ is a component for improving the glass in high-temperature viscosity and chemical durability and decreasing the liquidus temperature. When the content thereof exceeds 10 mol %, the refractive index decreases, and the stability against devitrification also decreases. The content thereof is therefore limited preferably to 0 to 10 mol %, more preferably to 0 to 7 mol %.

$Y_2O_3$ and $Yb_2O_3$ are used as components for imparting high-refractivity low-dispersion properties. When they are incorporated in a small amount, they increase the refractive index of the glass and improve the chemical duarability of the glass. However, the above effects of $Y_2O_3$ and $Yb_2O_3$ are small as compared with $La_2O_3$ and $Gd_2O_3$, and when the content of each of $Y_2O_3$ and $Yb_2O_3$ is greater than 10 mol %, the stability of the glass against devitrification is impaired, and the glass transition temperature and the sag temperature increase. The content of each of $Y_2O_3$ and $Yb_2O_3$ is therefore preferably limited to 0 to 10 mol %, more preferably to 0 to 8 mol %.

All of $TiO_2$, $Ta_2O_5$, $Nb_2O_5$ and $WO_3$ are components for improving the glass in stability and refractive index. When the content of each of these components exceeds 8 mol %, the dispersion comes to be great, and the stability against devitrification decreases. The content of each component is therefore preferably limited to 0 to 8 mol %, more preferably 0 to 5 mol %.

For the above reasons, the optical glass II preferably has a composition comprising 45 to 65 mol % of $B_2O_3$, 5 to 22 mol % of $La_2O_3$, 1 to 20 mol % of $Gd_2O_3$, provided that the total content of $La_2O_3$ and $Gd_2O_3$ is 14 to 30 mol %, 5 to 30 mol % of ZnO, 0 to 10 mol % of $SiO_2$, 0 to 6.5 mol % of $ZrO_2$, 0 to 1 mol % of $Sb_2O_3$, 0 to 10 mol % of $Li_2O$, 0 to 5 mol % of $Na_2O$, 0 to 5 mol % of $K_2O$, provided that the total content of $Li_2O$, $Na_2O$ and $K_2O$ is 0 to 10 mol %, 0 to 10 mol % of MgO, 0 to 10 mol % of CaO, 0 to 10 mol % of SrO, 0 to 10 mol % of BaO, provided that the total content of MgO, CaO, SrO and BaO is 0 to 15 mol %, 0 to 10 mol % of $Al_2O_3$, 0 to 10 mol % of $Y_2O_3$, 0 to 10 mol % of $Yb_2O_3$, 0 to 8 mol % of $TiO_2$, 0 to 8 mol % of $Ta_2O_5$, 0 to 8 mol % of $Nb_2O_5$ and 0 to 8 mol % of $WO_3$. The total content of the above components is preferably at least 95 mol %, more preferably at least 99 mol %, still more preferably 100 mol %.

The optical glass II more preferably has a composition comprising 47 to 60 mol % of $B_2O_3$, 7 to 20 mol % of $La_2O_3$, 4 to 15 mol % of $Gd_2O_3$, 8 to 25 mol % of ZnO, 0 to 8 mol % of $SiO_2$, 1 to 6.5 mol % of $ZrO_2$, 0.5 to 6.5 mol % of $Li_2O$, 0 to 4 mol % of $Na_2O$, 0 to 4 mol % of $K_2O$, provided that the total content of $Li_2O$, $Na_2O$ and $K_2O$ is 0 to 8 mol %, 0 to 8 mol % of MgO, 0 to 8 mol % of CaO, 0 to 8 mol % of SrO, 0 to 8 mol % of BaO, provided that the total content of MgO, CaO, SrO and BaO is 0 to 12 mol %, 0 to 7 mol % of $Al_2O_3$, 0 to 8 mol % of $Y_2O_3$, 0 to 8 mol % of $Yb_2O_3$, 0 to 5 mol % of $TiO_2$, 0 to 5 mol % of $Ta_2O_5$, 0 to 5 mol % of $Nb_2O_5$ and 0 to 5 mol % of $WO_3$. In the above preferred composition, the total content of the above components and $Sb_2O_3$ is preferably at least 95 mol %, more preferably at least 99 mol %, still more preferably 100 mol %.

Further, the optical glass II particularly preferably has a composition comprising 47 to 60 mol % of $B_2O_3$, 7 to 20 mol % of $La_2O_3$, 4 to 15 mol % of $Gd_2O_3$, 8 to 25 mol % of ZnO, 1 to 8 mol % of $SiO_2$, 1 to 6.5 mol % of $ZrO_2$, 0.5 to 6.5 mol % of $Li_2O$ and 0.1 to 5 mol % of $Ta_2O_5$, and the total content of the above components and $Sb_2O_3$ is preferably at least 95 mol %, more preferably at least 99 mol %, still more preferably 100 mol %.

In any one of the above compositions which the optical glass II preferably has, more preferably has and particularly preferably has, the content of $Sb_2O_3$ is preferably limited to 0 to 0.5 mol %, more preferably to 0 to 0.1 mol %, still more preferably to 0 to 0.05 mol %.

In any one of the above compositions which the optical glass II preferably has, more preferably has and particularly preferably has, the upper limit of the content of $ZrO_2$ is further preferably 6 mol % in view of high-temperature shapability and optical properties.

In any one of the above compositions, the total content of $La_2O_3$ and $Gd_2O_3$ is preferably limited to 14 to 30 mol %, more preferably 14 to 24 mol %, still more preferably to 15 to 22 mol %.

The above optical glass II is transparent in a visible region, is excellent in precision press-moldability, hot-shapability for preparing a preform, high-refractivity low-dispersion properties and glass stability, and has a refractive index (nd) in the range of from 1.72 to 1.83 and an Abbe's number (vd) in the range of from 45 to 55. Further, the above optical glass II permits adjustment of the glass transition temperature (Tg) to 630° C. or lower and adjustment of the viscosity at its liquidus temperature to at least 0.5 Pa·s.

In any one of the above compositions which the optical glass II preferably has, more preferably has and particularly preferably has, preferably, the glass transition temperature (Tg) is 630° C. or lower, the refractive index (nd) is 1.72 to 1.83, the Abbe's number (vd) is 45 to 55, and the viscosity at liquidus temperature thereof is at least 0.6 Pa·s. More preferably, the refractive index (nd) is 1.74 to 1.80, the Abbe's number (vd) is 45 to 52. When precision press-moldability, hot-shapability for preparing a preform and higher functionality related to optical constants are taken into account, particularly preferably, the optical glass has a viscosity of 0.7 Pa·s at its liquidus temperature in addition to the above properties.

In view of the stability of the glass during hot-shaping, the liquidus temperature is preferably 1,050° C. or lower, more preferably 1,030° C. or lower.

The process for the preparation of press-molding preforms, provided by the present invention, will be explained hereinafter.

The press-molding preform of the present invention is made of the above optical glass (I or II), and a process of hot-shaping a glass in a molten or softened state into a preform is excellent as a process for the production of press-molding preforms with high productivity and high accuracy of weight. As the process for the preparation of preforms, provided by the present invention, therefore, there is employed a process of melting, clarifying and stirring a glass material that is to give the above optical glass (I or II), to obtain a uniform molten glass, allowing the molten glass to flow out of a pipe made of platinum or a platinum alloy, to obtain a glass gob from a predetermined amount of the molten glass and shaping the molten glass gob into a preform. In the above process, the molten glass is continuously flowed out from the flow outlet of the above pipe, a forward end portion of the glass that has flowed out is separated, to obtain a predetermined amount of a glass gob, and the glass gob is shaped into the form of a preform while the glass has a temperature in the temperature range in which the glass is plastic-deformable. The method of separating the forward end portion of the glass that has flowed out includes a falling method and a fall-cutting method as is already described. In any case, mechanical cutting is undesirable, since mechanical cutting using a cutter for the separation leaves a cut portion as a mark on a preform and degrades the quality of a precision press-molded article. When the above optical glass is used, the forward end portion of the glass that has flowed out through the flow outlet of the pipe can be separated without mechanical cutting. The flow rate and the temperature of the flowing glass are maintained at constant levels, and the dropping or falling condition is maintained at a constant level, whereby preforms having a predetermined weight each can be highly accurately prepared with excellent reproducibility. The above process is suitable for preparing preforms having a weight in the range of from 1 to 5,000 mg with high accuracy of weight.

The forward end portion of the separated glass is supported, for example, with a shaping mold having a concave shaping surface from which gas is being ejecting, and the glass is floated and rotated with a pressure of the gas, to form a preform having the form of a sphere, an ellipse, or the like. The above shaping method will be referred to as "float shaping method". In the float shaping method, it is required to satisfy severe conditions with regard to the viscosity of the glass during shaping. When preforms made of the optical glass of the present invention are shaped, the properties of the glass are suitable for the float shaping method, so that the optical glass of the present invention also permits excellent float shaping. Each of the thus-prepared preforms may be provided with a release film on a surface as required.

The process for the production of a precision press-molded article will be explained hereinafter. The precision press-molding refers to a method in which a re-heated preform is press-molded with a mold having a cavity having a predetermined form, to produce a molded article having a form that is the same as, or very similar to, the form of a final product, as is already described. The precision press-molding method makes it possible to produce a final product, particularly, a final product required to have very high form accuracy or surface accuracy such as an optical part, without cutting or polishing a molded article or in combination with only polishing of a molded article in which the removal amount by the polishing is very small. The precision press-molding process of the present invention is therefore suitable for producing optical parts such as a lens, a lens array, a diffraction grating, a prism, and the like, and it is particularly the most suitable for producing aspherical lens with high productivity. According to the process for the production of a precision press-molded article, provided by the present invention, an optical element having high-refractivity low-dispersion properties can be produced. Further, the glass forming the preform has a low glass transition temperature (Tg) of 630° C. or lower, and the preform can be press-molded at a relatively low temperature as far as press-molding of a glass is concerned, so that a load on the molding surface of a mold is decreased, which makes it possible to increase the lifetime of the mold. Further, since the glass forming the preform has high stability, the devitrification of the glass can be effectively prevented at the steps of re-heating and press-molding. Furthermore, a series of steps from the step of melting a glass to the step of obtaining a final product can be carried out with high productivity.

In the precision press-molding method, the preform having a surface in a clean state is re-heated such that the glass forming the preform has a viscosity in the range of from $10^5$ to $10^{11}$ Pa·s, and the re-heated preform is press-molded with a mold having an upper mold member and a lower mold member. The molding surface of the mold may have a release film as required. The press-molding is preferably carried-out in a nitrogen gas or inert gas atmosphere for preventing the oxidation of the molding surface of the mold. The press-molded article is taken out of the mold, and it is gradually cooled as required. When the molded article is an optical element such as a lens, an optical thin film may be coated on the surface thereof as required.

In this manner, optical parts made of the high-refractivity low-dispersion glass having a refractive index (nd) of 1.72 to 1.83 and an Abbe's number (vd) of 45 to 55, such as lenses, lens arrays, diffraction gratings, prisms, etc., can be produced with high accuracy and excellent productivity.

The present invention also provided an optical part made of the optical glass I or II of the present invention.

EXAMPLES

The present invention will be more specifically explained with reference to Examples hereinafter, while the present invention shall not be limited by these Examples.

Examples 1-52

Oxides, carbonates, sulfates, nitrates, hydroxides, etc., which corresponded to glass components, such as $SiO_2$, $Al_2O_3$, $Al(OH)_3$, $MgO$, $CaCO_3$, $Y_2O_3$, $TiO_2$, $ZrO_2$, $Li_2CO_3$, etc., were provided as glass raw materials, and these raw materials were weighed such that these materials had a predetermined mixing ratio and formed a composition shown in Tables 1 to 9. These materials were fully mixed to prepare a formulated batch, the mixture was placed in a platinum crucible, and while the mixture was stirred at 1,200 to 1,250° C., the mixture (glass) was melted in air for 2 to 4 hours. Then, a molten glass was flowed into a 40×70×15 mm mold made of carbon, allowed to cool to a glass transition temperature, and then, immediately placed in an annealing furnace. The glass was annealed in a transition temperature range of the glass for approximately 1 hour, and allowed to cool to room temperature in the furnace, to produce an optical glass. In this manner, optical glasses of 52 types in Examples 1 to 52 were prepared. Thus-obtained glasses were observed through a microscope to show no precipitation of a crystal. The thus-obtained glasses were transparent and uniform optical glasses, and had compositions, optical constants [refractive indices (nd) and Abbe's numbers (vd)], glass transition temperatures (Tg), liquidus temperatures (LT) and viscosities at liquidus temperatures shown in Tables 1 to 9. In these Examples, the refractive indices (nd), Abbe's numbers (vd), the glass transition temperatures (Tg), sag temperatures (Ts), the liquidus temperatures (LT), the viscosities at liquidus temperatures and viscosities at 1,100° C. were measured as follows.

(1) Refractive Index (nd) and Abbe's Number (vd)

An optical glass obtained was measured at a temperature decrease rate of −30° C./hour in gradual cooling.

(2) Glass Transition Temperature (Tg) and Sag Temperature (Ts)

A sample was measured at a temperature elevation rate of 4° C./minute with a thermomechanical analyzer supplied by Rigaku Denki K.K.

(3) Liquidus Temperature (LT)

A sample was maintained in a devitrification-testing furnace having a temperature gradient of 400 to 1,100° C. for 1 hour, and the sample was observed for a crystal through a microscope, to measure a liquidus temperature.

(4) Viscosity

A sample was measured for a viscosity by a viscosity measurement method using a coaxial dual cylindrical rotational viscometer according to JIS Z8803.

As shown in Tables 1 to 9, the glasses had predetermined compositions and had refractive indices (nd) in the range of from 1.72 to 1.83 and Abbe's numbers (vd) in the range of from 45 to 55. Further, they had glass transition temperatures (Tg) of lower than 630° C. and viscosities of at least 0.6 Pa·s at their liquidus temperatures. Further, they had viscosities of 4 Pa·s or lower at 1,100° C.

TABLE 1

|  |  | Example |  |  |  |  |  |
|---|---|---|---|---|---|---|---|
|  |  | 1 | 2 | 3 | 4 | 5 | 6 |
| Glass Composition (mol %) | $B_2O_3$ | 55.00 | 55.00 | 52.50 | 52.50 | 52.50 | 52.50 |
|  | $La_2O_3$ | 11.00 | 12.50 | 12.50 | 12.50 | 12.50 | 12.50 |
|  | $Gd_2O_3$ | 5.00 | 7.50 | 7.50 | 6.50 | 4.50 | 2.50 |
|  | $La_2O_3 + Gd_2O_3$ | 16.00 | 20.00 | 20.00 | 19.00 | 17.00 | 15.00 |
|  | ZnO | 17.50 | 17.50 | 20.00 | 20.00 | 20.00 | 20.00 |
|  | $SiO_2$ | 0.00 | 0.00 | 0.00 | 0.00 | 0.00 | 0.00 |
|  | $Al_2O_3$ | 6.50 | 2.50 | 2.50 | 2.50 | 2.50 | 2.50 |
|  | $Li_2O$ | 0.00 | 0.00 | 0.00 | 0.00 | 0.00 | 0.00 |
|  | $ZrO_2$ | 5.00 | 5.00 | 5.00 | 5.00 | 5.00 | 5.00 |
|  | $Ta_2O_5$ | 0.00 | 0.00 | 0.00 | 1.00 | 3.00 | 5.00 |
|  | $Nb_2O_5$ | 0.00 | 0.00 | 0.00 | 0.00 | 0.00 | 0.00 |
|  | $WO_3$ | 0.00 | 0.00 | 0.00 | 0.00 | 0.00 | 0.00 |
|  | $TiO_2$ | 0.00 | 0.00 | 0.00 | 0.00 | 0.00 | 0.00 |
|  | Other components | 0.00 | 0.00 | 0.00 | 0.00 | 0.00 | 0.00 |
|  | Total amount | 100.00 | 100.00 | 100.00 | 100.00 | 100.00 | 100.00 |
| Physical properties | Transition temperature (° C.) | 623 | 623 | 614.4 | 613.2 | 617 | 618.8 |
|  | Sag temperature (° C.) | 663 | 665 | 652.6 | 669.8 | 668 | 659.1 |
|  | Liquidus temperature (° C.) | 990 | 990 | 1000 | 1000 | 1010 | 1010< |
|  | Viscosity ($\times 10^{-1}$ Pa·s) | 12.5 | 12.5 | 11.5 | 10.51 | 10.49 | 12.5 |
|  | Refractive index (nd) | 1.72585 | 1.7564 | 1.76294 | 1.76571 | 1.77097 | 1.77565 |
|  | Abbe's number (vd) | 51.44 | 50.49 | 49.96 | 49.24 | 47.29 | 45.33 |

TABLE 2

|  |  | Example |  |  |  |  |  |
|---|---|---|---|---|---|---|---|
|  |  | 7 | 8 | 9 | 10 | 11 | 12 |
| Glass Composition (mol %) | $B_2O_3$ | 52.50 | 52.50 | 52.50 | 52.50 | 52.50 | 53.00 |
|  | $La_2O_3$ | 12.50 | 12.50 | 12.50 | 12.50 | 11.50 | 11.50 |
|  | $Gd_2O_3$ | 6.50 | 4.50 | 2.50 | 1.00 | 7.00 | 7.00 |
|  | $La_2O_3 + Gd_2O_3$ | 19.00 | 17.00 | 15.00 | 13.50 | 18.50 | 18.50 |
|  | ZnO | 20.00 | 20.00 | 20.00 | 20.00 | 18.50 | 17.50 |
|  | $SiO_2$ | 0.00 | 0.00 | 0.00 | 0.00 | 2.00 | 2.00 |
|  | $Al_2O_3$ | 2.50 | 2.50 | 2.50 | 2.50 | 1.00 | 1.00 |
|  | $Li_2O$ | 0.00 | 0.00 | 0.00 | 0.00 | 1.50 | 2.00 |
|  | $ZrO_2$ | 5.00 | 5.00 | 5.00 | 5.00 | 5.00 | 5.00 |
|  | $Ta_2O_5$ | 0.00 | 0.00 | 0.00 | 0.00 | 1.00 | 1.00 |
|  | $Nb_2O_5$ | 0.00 | 0.00 | 0.00 | 0.00 | 0.00 | 0.00 |
|  | $WO_3$ | 1.00 | 3.00 | 5.00 | 6.50 | 0.00 | 0.00 |
|  | $TiO_2$ | 0.00 | 0.00 | 0.00 | 0.00 | 0.00 | 0.00 |
|  | Other components | 0.00 | 0.00 | 0.00 | 0.00 | 0.00 | 0.00 |
|  | Total amount | 100.00 | 100.00 | 100.00 | 100.00 | 100.00 | 100.00 |
| Physical properties | Transition temperature (° C.) | 611 | 609 | 605.4 | 601 | 600.6 | 599.3 |
|  | Sag temperature (° C.) | 659 | 653 | 644.4 | 640 | 639.8 | 638 |
|  | Liquidus temperature (° C.) | 990 | 1010 | 990 | 990 | 1000 | 1000 |
|  | Viscosity | 12 | 6.83 | 11.2 | 10.8 | 8.66 | 8.08 |

TABLE 2-continued

|  |  | Example | | | | | |
|---|---|---|---|---|---|---|---|
|  |  | 7 | 8 | 9 | 10 | 11 | 12 |
|  | ($\times 10^{-1}$ Pa·s) | | | | | | |
|  | Refractive index (nd) | 1.77145 | 1.76813 | 1.76305 | 1.75701 | 1.77038 | 1.76877 |
|  | Abbe's number (vd) | 48.76 | 47.29 | 46.18 | 45.35 | 49.06 | 49.21 |

TABLE 3

|  |  | Example | | | | | |
|---|---|---|---|---|---|---|---|
|  |  | 13 | 14 | 15 | 16 | 17 | 18 |
| Glass Composition (mol %) | $B_2O_3$ | 51.00 | 51.00 | 55.26 | 55.26 | 55.26 | 57.77 |
|  | $La_2O_3$ | 9.75 | 10.00 | 12.28 | 9.65 | 7.02 | 10.80 |
|  | $Gd_2O_3$ | 8.75 | 9.00 | 7.90 | 10.53 | 13.16 | 5.76 |
|  | $La_2O_3 + Gd_2O_3$ | 18.50 | 19.00 | 20.18 | 20.18 | 20.18 | 16.56 |
|  | ZnO | 16.00 | 16.00 | 19.30 | 19.30 | 19.30 | 20.17 |
|  | $SiO_2$ | 5.00 | 5.00 | 0.00 | 0.00 | 0.00 | 0.00 |
|  | $Al_2O_3$ | 0.00 | 0.00 | 0.00 | 0.00 | 0.00 | 0.00 |
|  | $Li_2O$ | 3.50 | 3.50 | 0.00 | 0.00 | 0.00 | 0.00 |
|  | $ZrO_2$ | 5.50 | 5.00 | 5.26 | 5.26 | 5.26 | 5.50 |
|  | $Ta_2O_5$ | 0.50 | 0.50 | 0.00 | 0.00 | 0.00 | 0.00 |
|  | $Nb_2O_5$ | 0.00 | 0.00 | 0.00 | 0.00 | 0.00 | 0.00 |
|  | $WO_3$ | 0.00 | 0.00 | 0.00 | 0.00 | 0.00 | 0.00 |
|  | $TiO_2$ | 0.00 | 0.00 | 0.00 | 0.00 | 0.00 | 0.00 |
|  | Other components | 0.00 | 0.00 | 0.00 | 0.00 | 0.00 | 0.00 |
|  | Total amount | 100.00 | 100.00 | 100.00 | 100.00 | 100.00 | 100.00 |
| Physical properties | Transition temperature (° C.) | 592.7 | 592.6 | 625 | 628 | 630 | 625 |
|  | Sag temperature (° C.) | 632.8 | 635.5 | 668 | 670 | 672 | 667 |
|  | Liquidus temperature (° C.) | 1010 | 1010 | 1010 | 1000 | 1000 | 1010 |
|  | Viscosity ($\times 10^{-1}$ Pa·s) | 7.18 | 7 | 10 | 11 | 11 | 12 |
|  | Refractive index (nd) | 1.7657 | 1.767 | 1.77468 | 1.77264 | 1.77013 | 1.7506 |
|  | Abbe's number (vd) | 49.6 | 49.7 | 49.5 | 49.64 | 49.69 | 50.7 |

TABLE 4

|  |  | Example | | | | | |
|---|---|---|---|---|---|---|---|
|  |  | 19 | 20 | 21 | 22 | 23 | 24 |
| Glass Composition (mol %) | $B_2O_3$ | 59.00 | 55.26 | 59.46 | 55.26 | 55.26 | 55.26 |
|  | $La_2O_3$ | 9.00 | 12.28 | 12.61 | 12.28 | 12.28 | 12.28 |
|  | $Gd_2O_3$ | 5.78 | 7.89 | 8.11 | 7.90 | 7.90 | 7.90 |
|  | $La_2O_3 + Gd_2O_3$ | 14.78 | 20.17 | 20.72 | 20.18 | 20.18 | 20.18 |
|  | ZnO | 20.60 | 15.80 | 19.82 | 19.30 | 19.30 | 19.30 |
|  | $SiO_2$ | 0.00 | 0.00 | 0.00 | 0.00 | 0.00 | 0.00 |
|  | $Al_2O_3$ | 0.00 | 0.00 | 0.00 | 0.00 | 0.00 | 0.00 |
|  | $Li_2O$ | 0.00 | 0.00 | 0.00 | 0.00 | 0.00 | 0.00 |
|  | $ZrO_2$ | 5.62 | 5.26 | 0.00 | 0.00 | 0.00 | 0.00 |
|  | $Ta_2O_5$ | 0.00 | 0.00 | 0.00 | 0.00 | 0.00 | 0.00 |
|  | $Nb_2O_5$ | 0.00 | 0.00 | 0.00 | 0.00 | 0.00 | 0.00 |
|  | $WO_3$ | 0.00 | 0.00 | 0.00 | 0.00 | 0.00 | 0.00 |
|  | $TiO_2$ | 0.00 | 0.00 | 0.00 | 5.26 | 0.00 | 0.00 |
|  | Other components | 0.00 | MgO: 3.51 | 0.00 | 0.00 | $GeO_2$: 5.26 | $WO_3$: 5.26 |
|  | Total amount | 100.00 | 100.00 | 100.00 | 100.00 | 100.00 | 100.00 |
| Physical properties | Transition temperature (° C.) | 625 | 622 | 622 | 620 | 623 | 617 |
|  | Sag | 667 | 664 | 664 | 662 | 665 | 659 |

TABLE 4-continued

| | | Example | | | | | |
|---|---|---|---|---|---|---|---|
| | | 19 | 20 | 21 | 22 | 23 | 24 |
| | temperature (° C.) | | | | | | |
| | Liquidus temperature (° C.) | 1010 | 1000 | 1030 | 1000 | 1000 | 1000 |
| | Viscosity (×$10^{-1}$ Pa·s) | 10 | 10 | 8 | 10 | 10 | 10 |
| | Refractive index (nd) | 1.73768 | 1.77045 | 1.75053 | 1.78022 | 1.75544 | 1.77311 |
| | Abbe's number (vd) | 51.1 | 49.9 | 51.87 | 45.79 | 51.04 | 46.71 |

TABLE 5

| | | Example | | | | | |
|---|---|---|---|---|---|---|---|
| | | 25 | 26 | 27 | 28 | 29 | 30 |
| Glass Composition (mol %) | $B_2O_3$ | 56.76 | 56.80 | 50.00 | 51.30 | 54.39 | 54.39 |
| | $La_2O_3$ | 12.61 | 12.60 | 12.28 | 12.00 | 12.28 | 12.28 |
| | $Gd_2O_3$ | 8.11 | 8.10 | 7.90 | 7.70 | 7.90 | 7.90 |
| | $La_2O_3 + Gd_2O_3$ | 20.72 | 20.70 | 20.18 | 19.70 | 20.18 | 20.18 |
| | ZnO | 19.82 | 19.80 | 19.30 | 18.80 | 17.54 | 17.54 |
| | $SiO_2$ | 0.00 | 0.00 | 0.00 | 5.10 | 1.75 | 1.75 |
| | $Al_2O_3$ | 0.00 | 0.00 | 5.26 | 0.00 | 0.00 | 0.00 |
| | $Li_2O$ | 0.00 | 0.00 | 0.00 | 0.00 | 0.88 | 0.00 |
| | $ZrO_2$ | 0.00 | 0.00 | 5.26 | 5.10 | 5.26 | 5.26 |
| | $Ta_2O_5$ | 0.00 | 0.00 | 0.00 | 0.00 | 0.00 | 0.00 |
| | $Nb_2O_5$ | 0.00 | 2.70 | 0.00 | 0.00 | 0.00 | 0.00 |
| | $WO_3$ | 0.00 | 0.00 | 0.00 | 0.00 | 0.00 | 0.00 |
| | $TiO_2$ | 0.00 | 0.00 | 0.00 | 0.00 | 0.00 | 0.00 |
| | Other components | $Ga_2O_3$: 2.70 | 0.00 | 0.00 | 0.00 | 0.00 | $Na_2O$: 0.88 |
| | Total amount | 100.00 | 100.00 | 100.00 | 100.00 | 100.00 | 100.00 |
| Physical properties | Transition temperature (° C.) | 617 | 620 | 618 | 625 | 608 | 613 |
| | Sag temperature (° C.) | 659 | 665 | 663 | 675 | 650 | 655 |
| | Liquidus temperature (° C.) | 1020 | 1010 | 1040 | 1010 | 1020 | 1030 |
| | Viscosity (×$10^{-1}$ Pa·s) | 7 | 8 | 6 | 8 | 7 | 6 |
| | Refractive index (nd) | 1.75651 | 1.78045 | 1.77193 | 1.76958 | 1.77137 | 1.7681 |
| | Abbe's number (vd) | 51.04 | 46.78 | 49.4 | 49.9 | 50.2 | 49.9 |

TABLE 6

| | | Example | | | | | |
|---|---|---|---|---|---|---|---|
| | | 31 | 32 | 33 | 34 | 35 | 36 |
| Glass Composition (mol %) | $B_2O_3$ | 54.39 | 48.75 | 51.30 | 51.30 | 51.30 | 51.30 |
| | $La_2O_3$ | 12.28 | 11.76 | 11.30 | 11.30 | 10.43 | 8.70 |
| | $Gd_2O_3$ | 7.90 | 7.56 | 6.96 | 6.96 | 7.83 | 9.56 |
| | $La_2O_3 + Gd_2O_3$ | 20.18 | 19.32 | 18.26 | 18.26 | 18.26 | 18.26 |
| | ZnO | 17.54 | 13.45 | 15.65 | 15.65 | 15.65 | 15.65 |
| | $SiO_2$ | 1.75 | 8.40 | 5.22 | 5.22 | 5.22 | 5.22 |
| | $Al_2O_3$ | 0.00 | 0.00 | 0.00 | 0.00 | 0.00 | 0.00 |
| | $Li_2O$ | 0.00 | 5.04 | 3.48 | 3.48 | 3.48 | 3.48 |
| | $ZrO_2$ | 5.26 | 5.04 | 5.22 | 5.22 | 5.22 | 5.22 |
| | $Ta_2O_5$ | 0.00 | 0.00 | 0.87 | 0.87 | 0.87 | 0.87 |
| | $Nb_2O_5$ | 0.00 | 0.00 | 0.00 | 0.00 | 0.00 | 0.00 |
| | $WO_3$ | 0.00 | 0.00 | 0.00 | 0.00 | 0.00 | 0.00 |
| | $TiO_2$ | 0.00 | 0.00 | 0.00 | 0.00 | 0.00 | 0.00 |
| | Other components | $K_2O$: 0.88 | 0.00 | 0.00 | 0.00 | 0.00 | 0.00 |
| | Total amount | 100.00 | 100.00 | 100.00 | 100.00 | 100.00 | 100.00 |

TABLE 6-continued

| | | Example | | | | | |
|---|---|---|---|---|---|---|---|
| | | 31 | 32 | 33 | 34 | 35 | 36 |
| Physical properties | Transition temperature (° C.) | 615 | 580 | 587 | 587 | 588 | 592 |
| | Sag temperature (° C.) | 657 | 622 | 630 | 630 | 631 | 637 |
| | Liquidus temperature (° C.) | 1030 | 1050 | 1010 | 1010 | 1000 | 1000 |
| | Viscosity ($\times 10^{-1}$ Pa·s) | 6 | 6 | 7 | 7 | 9 | 10 |
| | Refractive index (nd) | 1.76463 | 1.76044 | 1.76626 | 1.76626 | 1.76469 | 1.76344 |
| | Abbe's number (vd) | 50 | 50.6 | 49.5 | 49.5 | 49.68 | 49.73 |

TABLE 7

| | | Example | | | | | |
|---|---|---|---|---|---|---|---|
| | | 37 | 38 | 39 | 40 | 41 | 42 |
| Glass Composition (mol %) | $B_2O_3$ | 50.21 | 49.57 | 54.14 | 54.40 | 53.96 | 52.60 |
| | $La_2O_3$ | 9.36 | 9.48 | 9.17 | 9.21 | 9.21 | 9.13 |
| | $Gd_2O_3$ | 9.36 | 9.48 | 9.17 | 9.21 | 9.65 | 9.57 |
| | $La_2O_3 + Gd_2O_3$ | 18.72 | 18.96 | 18.34 | 18.42 | 18.86 | 18.70 |
| | ZnO | 15.32 | 15.52 | 17.47 | 17.54 | 17.54 | 17.39 |
| | $SiO_2$ | 6.81 | 6.90 | 1.75 | 1.75 | 1.75 | 3.48 |
| | $Al_2O_3$ | 0.00 | 0.00 | 0.00 | 0.00 | 0.00 | 0.00 |
| | $Li_2O$ | 2.98 | 3.02 | 1.75 | 1.75 | 1.75 | 1.74 |
| | $ZrO_2$ | 5.11 | 5.17 | 6.11 | 5.26 | 5.26 | 5.22 |
| | $Ta_2O_5$ | 0.85 | 0.86 | 0.44 | 0.88 | 0.88 | 0.87 |
| | $Nb_2O_5$ | 0.00 | 0.00 | 0.00 | 0.00 | 0.00 | 0.00 |
| | $WO_3$ | 0.00 | 0.00 | 0.00 | 0.00 | 0.00 | 0.00 |
| | $TiO_2$ | 0.00 | 0.00 | 0.00 | 0.00 | 0.00 | 0.00 |
| | Other components | 0.00 | 0.00 | 0.00 | 0.00 | 0.00 | 0.00 |
| | Total amount | 100.00 | 100.00 | 100.00 | 100.00 | 100.00 | 100.00 |
| Physical properties | Transition temperature (° C.) | 596 | 600 | 604 | 605 | 602 | 603 |
| | Sag temperature (° C.) | 642 | 643 | 644 | 648 | 644 | 644 |
| | Liquidus temperature (° C.) | 1000 | 1010 | 1010 | 990 | 1010 | 1000 |
| | Viscosity ($\times 10^{-1}$ Pa·s) | 10 | 8 | 7 | 10 | 7 | 9 |
| | Refractive index (nd) | 1.76514 | 1.76810 | 1.76651 | 1.76701 | 1.76994 | 1.76861 |
| | Abbe's number (vd) | 49.42 | 49.3 | 49.42 | 49.35 | 49.19 | 49.33 |

TABLE 8

| | | Example | | | | | |
|---|---|---|---|---|---|---|---|
| | | 43 | 44 | 45 | 46 | 47 | 48 |
| Glass Composition (mol %) | $B_2O_3$ | 51.31 | 51.50 | 51.46 | 51.41 | 51.73 | 51.97 |
| | $La_2O_3$ | 9.05 | 10.50 | 10.49 | 10.48 | 10.55 | 10.53 |
| | $Gd_2O_3$ | 9.48 | 8.50 | 8.49 | 8.48 | 8.75 | 8.52 |
| | $La_2O_3 + Gd_2O_3$ | 18.53 | 19.00 | 18.98 | 18.96 | 19.30 | 19.06 |
| | ZnO | 17.24 | 15.51 | 15.50 | 15.48 | 14.70 | 15.56 |
| | $SiO_2$ | 5.17 | 4.97 | 4.96 | 4.96 | 4.99 | 4.37 |
| | $Al_2O_3$ | 0.00 | 0.00 | 0.00 | 0.00 | 0.00 | 0.00 |
| | $Li_2O$ | 1.72 | 3.05 | 3.05 | 3.04 | 3.28 | 3.06 |
| | $ZrO_2$ | 5.17 | 5.23 | 5.40 | 5.57 | 5.25 | 5.24 |
| | $Ta_2O_5$ | 0.86 | 0.74 | 0.65 | 0.57 | 0.74 | 0.74 |

TABLE 8-continued

|  |  | Example | | | | | |
|---|---|---|---|---|---|---|---|
|  |  | 43 | 44 | 45 | 46 | 47 | 48 |
|  | $Nb_2O_5$ | 0.00 | 0.00 | 0.00 | 0.00 | 0.00 | 0.00 |
|  | $WO_3$ | 0.00 | 0.00 | 0.00 | 0.00 | 0.00 | 0.00 |
|  | $TiO_2$ | 0.00 | 0.00 | 0.00 | 0.00 | 0.00 | 0.00 |
|  | Other components | 0.00 | 0.00 | 0.00 | 0.00 | 0.00 | 0.00 |
|  | Total amount | 100.00 | 100.00 | 100.00 | 100.00 | 100.00 | 100.00 |
| Physical properties | Transition temperature (° C.) | 604 | 596 | 595 | 596 | 596 | 595 |
|  | Sag temperature (° C.) | 647 | 636 | 639 | 636 | 638 | 639 |
|  | Liquidus temperature (° C.) | 1000 | 1010 | 1010 | 1010 | 1010 | 1010 |
|  | Viscosity ($\times 10^{-1}$ Pa·s) | 9 | 8.5 | 8 | 8 | 8.5 | 9 |
|  | Refractive index (nd) | 1.76709 | 1.76701 | 1.76679 | 1.76668 | 1.7672 | 1.76763 |
|  | Abbe's number (vd) | 49.36 | 49.58 | 49.56 | 49.75 | 49.62 | 49.52 |

TABLE 9

|  |  | Example | | | |
|---|---|---|---|---|---|
|  |  | 49 | 50 | 51 | 52 |
| Glass Composition (mol %) | $B_2O_3$ | 51.68 | 51.37 | 51.28 | 51.10 |
|  | $La_2O_3$ | 10.54 | 10.56 | 10.63 | 10.59 |
|  | $Gd_2O_3$ | 8.75 | 8.56 | 8.63 | 8.60 |
|  | $La_2O_3 + Gd_2O_3$ | 19.28 | 19.12 | 19.26 | 19.20 |
|  | ZnO | 14.69 | 15.47 | 15.44 | 15.39 |
|  | $SiO_2$ | 4.98 | 4.95 | 4.95 | 5.27 |
|  | $Al_2O_3$ | 0.00 | 0.00 | 0.00 | 0.00 |
|  | $Li_2O$ | 3.28 | 3.04 | 3.04 | 3.03 |
|  | $ZrO_2$ | 5.42 | 5.39 | 5.38 | 5.36 |
|  | $Ta_2O_5$ | 0.66 | 0.65 | 0.65 | 0.65 |
|  | $Nb_2O_5$ | 0.00 | 0.00 | 0.00 | 0.00 |
|  | $WO_3$ | 0.00 | 0.00 | 0.00 | 0.00 |
|  | $TiO_2$ | 0.00 | 0.00 | 0.00 | 0.00 |
|  | Other components | 0.00 | 0.00 | 0.00 | 0.00 |
|  | Total amount | 100.00 | 100.00 | 100.00 | 100.00 |
| Physical properties | Transition temperature (° C.) | 597 | 596 | 593 | 596 |
|  | Sag temperature (° C.) | 639 | 639 | 636 | 638 |
|  | Liquidus temperature (° C.) | 1010 | 1010 | 1010 | 1010 |
|  | Viscosity ($\times 10^{-1}$ Pa·s) | 8 | 9 | 9.5 | 9 |
|  | Refractive index (nd) | 1.76816 | 1.76759 | 1.76843 | 1.76781 |
|  | Abbe's number (vd) | 49.62 | 49.55 | 49.54 | 49.5 |

Note: The viscosities shown in Tables 1 to 9 are values at liquidus temperatures.

Comparative Examples 1-3

Optical glasses having compositions shown in Table 10 were prepared in the same manner as in Examples 1 to 52 and measured for various properties. Table 10 shows the results.

TABLE 10

|  |  | Comparative Example | | |
|---|---|---|---|---|
|  |  | 1 | 2 | 3 |
| Glass Composition (mol %) | $B_2O_3$ | 51.02 | 49.06 | 45.44 |
|  | $La_2O_3$ | 12.18 | 16.77 | 7.86 |
|  | $Gd_2O_3$ | 5.20 | 0.00 | 7.17 |
|  | $La_2O_3 + Gd_2O_3$ | 17.38 | 16.77 | 15.03 |
|  | ZnO | 8.76 | 9.63 | 0.00 |
|  | $SiO_2$ | 2.24 | 2.21 | 0.00 |
|  | $Al_2O_3$ | 0.00 | 0.00 | 0.00 |
|  | $Li_2O$ | 7.65 | 8.45 | 3.08 |
|  | $ZrO_2$ | 6.77 | 7.74 | 6.71 |
|  | $Ta_2O_5$ | 3.71 | 4.30 | 2.58 |
|  | $Nb_2O_5$ | 0.00 | 0.00 | 0.00 |
|  | $WO_3$ | 0.00 | 0.00 | 0.00 |
|  | $TiO_2$ | 0.00 | 0.00 | 0.00 |
|  | Other components | $Y_2O_3$: 1.49 $Sb_2O_3$: 0.09 | $Y_2O_3$: 1.18 $Sb_2O_3$: 0.09 | $Yb_2O_3$: 1.17 $Sb_2O_3$: 0.14 |
|  | Total amount | 100.00 | 100.00 | 100.00 |
| Physical properties | Transition temperature (° C.) | 576 | 563 | 507 |
|  | Sag temperature (° C.) | 625 | 610 | 619 |
|  | Liquidus temperature (° C.) | 1030 | Not measurable | 1080 |
|  | Viscosity ($\times 10^{-1}$ Pa · s) | 5.9 | Not measurable | 3 |
|  | Refractive index (nd) | 1.7897 | 1.7951 | 1.7958 |
|  | Abbe's number(vd) | 46.3 | 45.2 | 45.5 |

Note: The glass in Comparative Example 2 underwent devitrification when it flowed out from a pipe, and its liquidus temperature and viscosity were unmeasurable.

Note: The viscosities shown in Table 10 are values at liquidus temperatures.

Example 53

Each of high-quality homogenized molten glasses that were to give optical glasses shown in Tables 1 to 9 was continuously flowed out from a pipe made of a platinum alloy, dropped from a flow outlet of the pipe, and consecutively received with a plurality of preform-shaping molds, to a plurality of spherical preforms by a float shaping method. Each glass that was flowing out was adjusted to a temperature higher than the liquidus temperature thereof by several ° C. These preforms did not at all undergo devitrification, and the preforms had high weight accuracy. The preforms had glass compositions, optical constants and glass transition temperatures nearly equal to those in Tables 1 to 9.

Further, when the above procedures were repeated except that the dropping method was replaced with a falling-cutting method, similarly, no devitrification was observed, and preforms having high weight accuracy were obtained. In the dropping method and the falling-cutting method, no mark caused on the preforms by separation was found.

When the above procedures were repeated except that the pipe made of a platinum alloy was replaced with a pipe made of platinum, there was no case where flowing of the molten glass broke the pipe, as the flowing of the molten glass did not break the pipe of the platinum alloy.

Example 54

Figure 1:
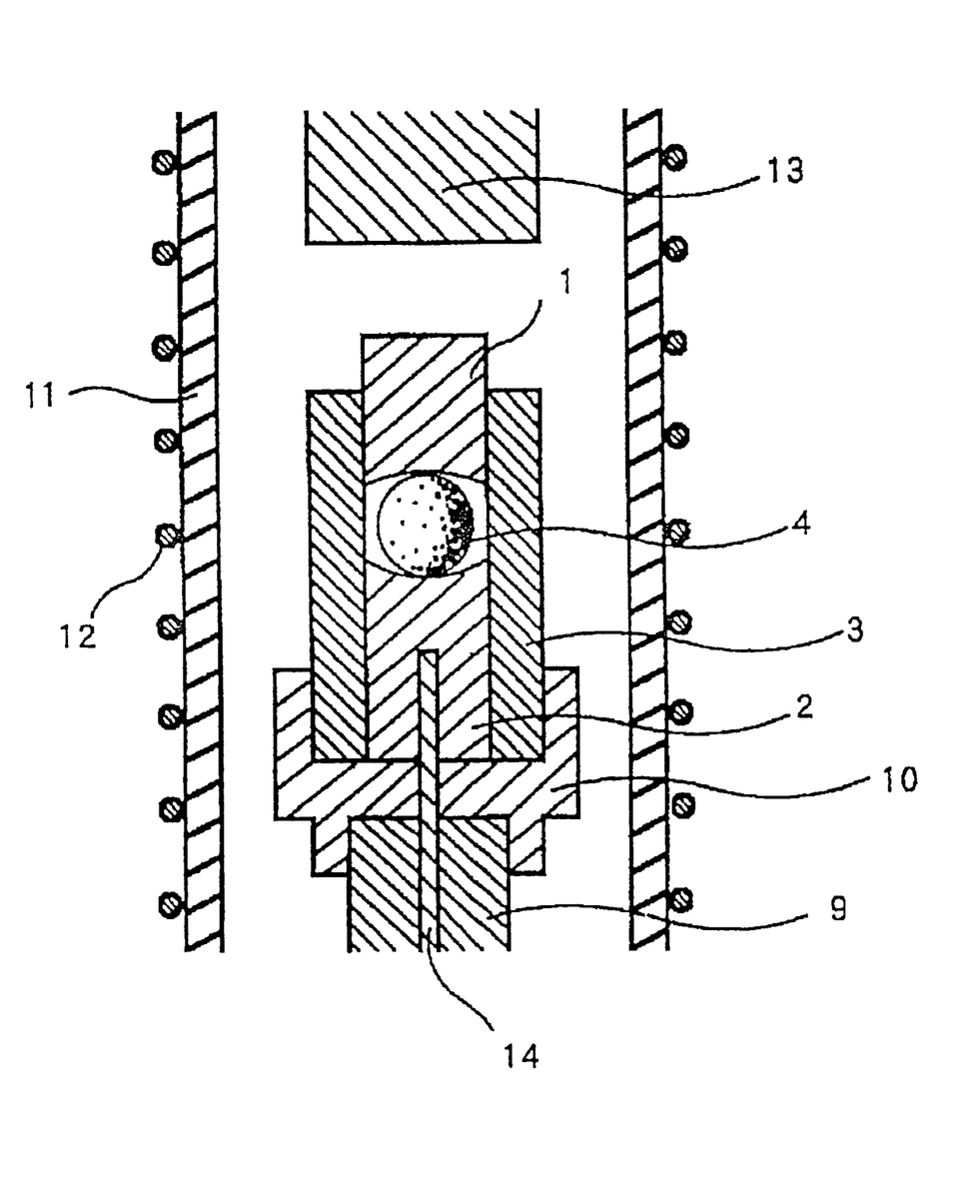
FIG. 1 is a schematic cross-sectional view of one example of a precision press-molding apparatus used in Examples.

Each of the preforms obtained in Example 53 was aspherical precision press-molded with a precision press-molding apparatus shown in FIG. 1, to obtain aspherical lenses. The preforms had a spherical form having a diameter of 2 to 30 mm. The preforms 4 were independently placed between a lower mold member 2 and an upper mold member 1, then, a nitrogen gas was introduced into a quartz tube 11, and a heater 12 was electrically switched on, to heat an inside of the quartz tube 11. For each preform, the temperature inside the mold was set at a temperature that was (sag temperature of glass+ 20° C. to 60° C.), and while said temperature was maintained, a pressing rod 13 was moved down to press the upper mold member 1, to press-mold the preform in the mold. The press-molding of each preform was carried out under a pressure of 8 MPa for 30 seconds. After the press-molding, the pressure was released, each glass molded article that was obtained by aspherical press-molding was gradually cooled to a temperature of (glass transition temperature–30° C.) in a state where the molded article was in contact with the lower mold member 2 and the upper mold member 1, and then it was rapidly cooled to room temperature. Each glass molded in the form of an aspherical lens was taken out of the mold. The thus-obtained aspherical lenses had remarkably high accuracy and had refractive indices (nd) and Abbe's number (vd) shown in Tables 1 to 9. The preforms may be re-hated before they are placed between the lower mold member 2 and the upper mold member 1. In FIG. 1, numeral 3 shows a guide mold member (sleeve), numeral 9 is a support rod, numeral 10 is a supporting bed, and numeral 14 shows a thermocouple.

When the cavity of the mold is designed to have a form as desired, other optical parts such as a spherical lens can be similarly produced by precision press-molding.

EFFECT OF THE INVENTION

According to the present invention, there can be provided a high-refractivity low-dispersion optical glass having excellent high-temperature shapability and precision press-moldability and an optical part made of the above optical glass.

According to the present invention, further, a press-molding preform is constituted of the above optical glass, and the press-molding preform is therefore suitable for precision press-molding.

Further, according to the present invention, there can be provided a production method in which a molten glass that is to give the above optical glass having a predetermined viscosity at its liquidus temperature is hot-shaped into press-molding preforms, whereby the press-molding preforms can be produced with high productivity.

Moreover, according to the present invention, there is provided a production method in which the above press-molding preforms are re-heated and precision press-molded, whereby press-molded articles such as highly accurate optical parts, etc., can be produced.

What is claimed is:

1. An optical glass comprising, by mol %, 45 to 65% of $B_2O_3$, 5 to 22% of $La_2O_3$, 1 to 20% of $Gd_2O_3$, provided that the total content of $La_2O_3$ and $Gd_2O_3$ is 14 to 30%, 5 to 30% of ZnO, 0 to 10% of $SiO_2$, 0 to 6.5% of $ZrO_2$ and 0 to 1% of $Sb_2O_3$, substantially containing none of lead and fluorine, and having a refractive index (nd) of 1.72 to 1.83, an Abbe's number (vd) of 45 to 55, a glass transition temperature (Tg) of 630° C. or lower and having a viscosity of at least 0.6 Pa·s at its liquidus temperature.

2. The optical glass of claim 1, which further contains 0 to 10 mol % of $Li_2O$, 0 to 5 mol % of $Na_2O$, 0 to 5 mol % of $K_2O$, provided that the total content of $Li_2O$, $Na_2O$ and $K_2O$ is 10 mol % or smaller, 0 to 10 mol % of MgO, 0 to 10 mol % of CaO, 0 to 10 mol % of SrO, 0 to 10 mol % of BaO, provided that the total content of MgO, CaO, SrO and BaO is 15 mol % or smaller, 0 to 10 mol % of $Al_2O_3$, 0 to 10 mol % of $Y_2O_3$, 0 to 10 mol % of $Yb_2O_3$, 0 to 8 mol % of $TiO_2$, 0 to 8 mol % of $Ta_2O_5$, 0 to 8 mol % of $Nb_2O_5$ and 0 to 8 mol % of $WO_3$, provided that the total content of said components and $B_2O_3$, $La_2O_3$, $Gd_2O_3$, ZnO, $SiO_2$, $ZrO_2$ and $Sb_2O_3$ is at least 95 mol %.

* * * * *